United States Patent [19]

Saito

[11] Patent Number: 4,457,428
[45] Date of Patent: Jul. 3, 1984

[54] CASE COMBINATION FOR MICROCASSETTE

[75] Inventor: Hideya Saito, Tokyo, Japan

[73] Assignee: TDK Electronics Co., Ltd., Tokyo, Japan

[21] Appl. No.: 374,924

[22] Filed: May 5, 1982

[30] Foreign Application Priority Data

May 22, 1981 [JP] Japan .............................. 56-73327[U]

[51] Int. Cl.$^3$ ........................................ B65D 85/672
[52] U.S. Cl. ................................... 206/232; 206/387; 220/408
[58] Field of Search ............... 206/387, 514, 563, 232; 220/408, 410; 312/8, 9

[56] References Cited

U.S. PATENT DOCUMENTS

| 3,117,692 | 1/1964 | Carpenter et al. | 206/501 |
| 3,498,494 | 3/1970 | Voorhees, Jr. | 206/501 |
| 3,640,379 | 2/1972 | Weingarden | 206/387 |
| 3,710,900 | 1/1973 | Fink | 220/410 |
| 4,114,044 | 9/1978 | Chiulli | 206/814 |
| 4,154,338 | 5/1979 | Adler | 206/232 |
| 4,154,341 | 5/1979 | Osanai | 206/387 |
| 4,159,769 | 7/1979 | Hatten | 206/563 |
| 4,201,298 | 5/1980 | Larson et al. | 206/387 |

FOREIGN PATENT DOCUMENTS

| 620042 | 10/1980 | Switzerland | 206/387 |
| 1034848 | 7/1966 | United Kingdom | 206/387 |

Primary Examiner—George E. Lowrance
Assistant Examiner—Jimmy G. Foster
Attorney, Agent, or Firm—Oblon, Fisher, Spivak, McClelland & Maier

[57] ABSTRACT

A case combination for microcassette includes a first inside case for microcassettes which is capable of enclosing the microcassette in two and a second outside case for microcassettes which is capable of enclosing said first inside case for microcassettes in two and specified in the same outline dimensions as the case for compact cassettes.

5 Claims, 3 Drawing Figures

CASE COMBINATION FOR MICROCASSETTE

BACKGROUND OF THE INVENTION

1. Field of the Invention

The present device relates to a case to enclose and hold a plurality of microcassettes, and is particularly concerned with a case combination for a microcassette which comprises a first inside case for microcassettes which is capable of enclosing two microcassettes and a second outside case for microcassettes which is capable of enclosing said first inside case for microcassettes and having the same outline dimensions as the case for compact cassettes, thereby providing a case for microcasettes which is the same-sized as a standard tape cassette (compact tape cassette).

2. Description of the Prior Art

A conventional microcassette case to enclose microcassetes is extremely small-sized, and hence it is troublesome to keep and arrange the microcassette cases in order individually. A dovetail (projection) and a dovetail groove (concavity) are formed hitherto on both sides of each microcassette case, a plurality of microcassette cases are coupled by engaging the dovetail of a microcassette with the dovetail groove of an adjacent microcassette (dovetail joint), thus handling them uniformly in usual circumstances.

However, the microcassette cases of different manufacturers have the dovetail and the dovetail groove arranged in various shapes, and thus the method according to dovetail joint is not applicable to the case where the different manufacturers' cases are to be coupled to each other for rearrangement.

In addition, when a desired cassette case is extracted out of those which are coupled according to the conventional dovetail joint method, i.e. isolated from a series coupled status, the remaining cassette cases are loosened in pieces consequently, which must be rejoined, resulting in troublesome handling. To extract a desired cassette case, therefore, by opening its cover without removing it from the coupled status may often result in loosening totally from a weak coupled status. Further such conventional coupling method is capable of giving such a size and shape as are considerably different from the case for conventional standard size of compact tape cassettes, and hence it is extremely inconvenient to keep and arrange these in order together with the cases for compact tape cassettes.

To settle such problem, there is suggested a case for microcassettes which is specified to enclose two microcassettes and in the same outline dimensions as the case for compact tape cassettes (Japanese Utility Model, Laid-Open No. 55-160563), however, said case for microcassettes is still problematical in how to enclose microcassettes efficiently leaving a dead space which is totally not concerned with that for enclosing microcassettes. In case a multiplicity of microcassettes are enclosed forcedly in the case for one microcassette only, to extract a desired microcassette is inevitably to cause the other cassettes to come out unnecessarily or to come in contact with the other microcassettes or at the worst, tends to damage tapes of the enclosed microcassettes. Then, where 4 microcassettes, for example, are enclosed in one case, the cassette will be handled in the unit of 4 microcassettes at all times, thus involving a status inconvenient for handling.

SUMMARY OF THE INVENTION

A principal object of the present device is therefore to provide a case combination for a microcassette, which comprises the first inside case for microcassettes capable of enclosing two microcassettes and the second outside case for microcassettes capable of enclosing said first inside case for microcassettes and having the same outline dimensions as the case for compact tape cassettes, thereby removing various defects unavoidable with a conventional case for microcassettes.

Another object of the present device is to provide a case combination for microcassettes which is capable of handling microcassettes in a unit of 2 pieces at least without damaging other microcassettes and keeping and arranging them in order safely and easily.

Still another object of the invention is to provide a case combination for microcassettes capable of keeping and arraging microcassettes in order together with the case for compact tape cassettes.

A case combination for microcassettes according to the device will be described in detail with reference to the accompanying drawings.

DETAILED DESCRIPTION OF THE PREFERRED EMBODIMENT

Figure 1:
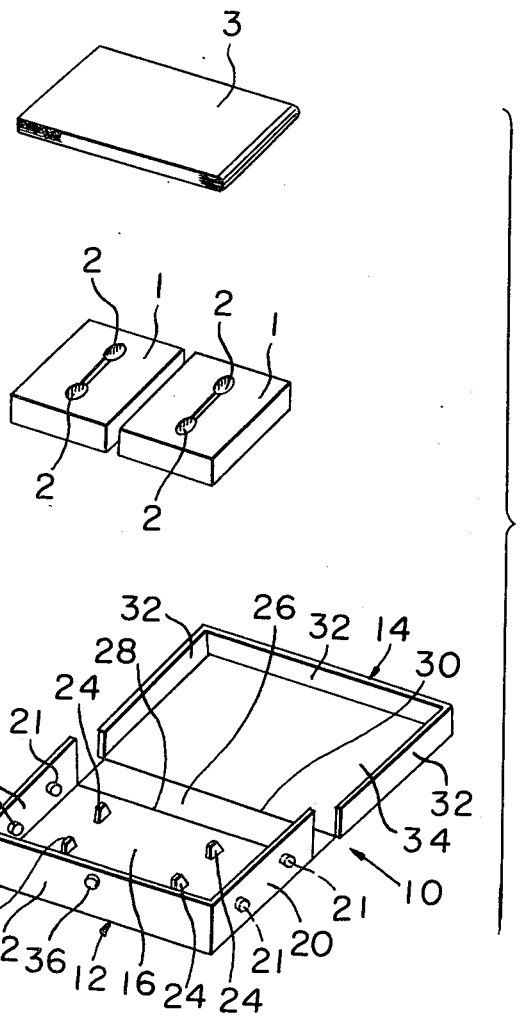
FIG. 1 is a perspective view of the first inside case for a microcassette according to the device, a microcassette and a brochure to be enclosed in said case.
Figure 2:
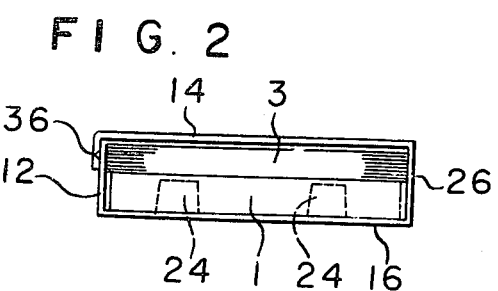
FIG. 2 is a sectional view representing a working state of the inside microcassette case illustrated in FIG. 1.

With reference to FIG. 1 and FIG. 2, there are exemplified a microcassette 1 and further the first inside case 10 for microcassettes which is also capable of enclosing a brochure 3, by preference, like a songbook or instruction manual. The inside case 10 for microcassettes consists of a main body part 12 and a cover 14. The main body part 12 consists of a bottom wall 16 and both side walls 18, 20 and a front wall 22 which are coupled solidly with the bottom wall 16. A rear wall 26 with its one edge hinged on the bottom wall 16 at a connection 28 is coupled to the bottom wall 16. To close an opening formed with both side walls 18, 20 and the front wall 22 of the main body part 12, the cover 14 consists of a circumferential wall 32 to be fitted in the circumference of each wall and a top wall 34 mounted solidly on the circumferential wall 32. The top wall 34 is then hinged on the other edge of the rear wall 26 at a connection 30.

A stopper 24 to fit a hub hole 2 of the microcassette 1 is provided on the bottom wall of the main body part 12 at a suitable position.

The first inside case 10 for microcassettes which is constituted as above is capable of enclosing two microcassettes 1. The enclosed microcassette 1 is then prevented from coming outwardly by an arrangement wherein the hub hole 2 of the cassette 1 is engaged with the stopper 24, and further the cover 14 is pivoted around the connections 28, 30 to close the opening of the main body part 12, thus settling in the inside case for microcassettes. The brochure 3 can be interposed in this case, as illustrated in FIG. 2, between the microcassette 1 and the cover 14. The brochure thus interposed may function to prevent the cassette from chattering in the case. Then, the cover 14 will be stopped elastically on the main body part 12 by a projection 36 provided suitably on a front wall 36 of the main body part 12.

In another operative embodiment of the first inside case 10 for microcassettes according to the present device, a projection 21 to hold the microcassette securely in the case through engaging elastically with said microcassette 1 when it is inserted in the inside case 10 for microcassettes is formed in suitable number, as illustrated in FIG. 1, on both side walls 18, 20. According to such constitution, the unexpected accident that the microcassette 1 will fly out of the case due to carelessness, even in the case where the cover 14 is not closed, and is damaged consequently can be avoided, and as will be described hereinafter, a brochure like songbook which is enclosed not in the inside case for cassettes but in the outside case will be functional enough to prevent the microcassette 1 from chattering in the case 10.

Figure 3:
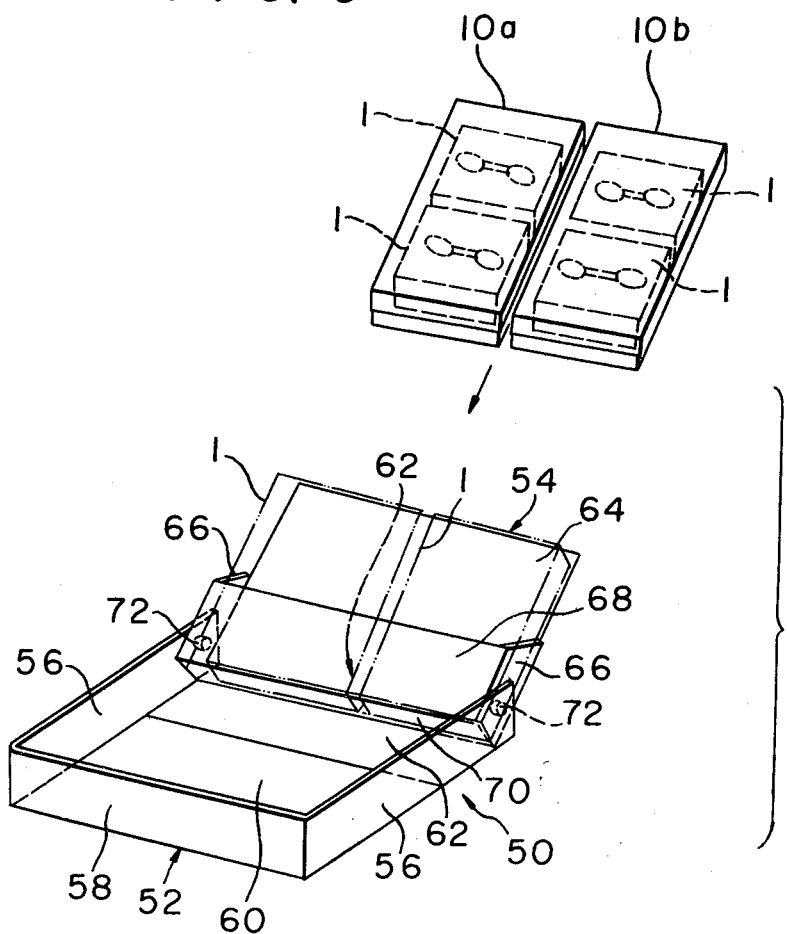
FIG. 3 is a perspective view of the second outside microcassette case according to the device and the first inside microcassette case to be enclosed in said case.

Next, the outside case 50 for microcassettes will be described with reference to FIG. 3. As will be apparent from the illustration, the second outside case 50 for microcassettes is the same in construction and shape as a conventional case for compact cassettes, but a stopper to fit in the hub hole of a tape cassette is not provided on the outside case 50 for microcassettes, which is the only difference therefrom. Namely, the outside case for microcassettes is provided with a case body 52 and a cover 54.

The case body 52 is constituted solidly of a side wall 56, a front wall 58 and a bottom wall 60, and the rear part 62 of the bottom wall is partly cut away. On the other hand, the cover 54 consists of a top wall 64, and a side wall 66, a bottom wall 68 and a rear wall 70 which are arranged on the rear part of the top wall 64; the top wall 64, side wall 66, bottom wall 68 and rear wall 70 form the pocket part 62 to constitute a part of the cassette enclosing part when the cover 54 is put on the case body 52. The case body 52 and the cover 54 are mounted pivotally to each other by an arrangement wherein a mounting shaft 72 projecting inwardly from the side wall 56 of the case body 52 is fitted in a mounting shaft hole provided on the outside of a partial side wall 66 arranged in the rear of the cover 54.

Two first inside cases 10a and 10b for microcassettes are inserted in the second outside case 50 fo microcassettes which is constituted as above at the pocket part 62 of the cover 54, and the cover 54 is pivoted toward the body 52, thereby enclosing the two cases 10a and 10b. It will be understood that 4 microcassettes are enclosed in said second outside case for microcassettes.

Then, one first inside case 10a is inserted in one space of the second outside case 50 for microcassettes, and a songbook can be enclosed in the other space instead of the other first inside case 10b.

Since the microcassette case combination according to the device is constituted as above, the microcassette is classified and kept in the unit of 2 pieces at least, other microcassettes will not be damaged at the time of handling, the microcassette can be kept and arranged in order together with a conventional compact cassette, and thus it has an extremely superior operation effect for practical application to require no special shelf nor vessel for storage and rearrangement of the microcassettes.

I claim:

1. In combination with a plurality of microcassettes, a case combination containing said microcassettes, said case combination comprising a first inside case containing said microcassettes which is constructed and sized for closely enclosing two of said microcassettes contained therein, a second outside case for microcassettes, said second outside case containing two of said inside cases and being constructed and sized for closely enclosing two of said first inside cases for microcassettes contained therein, said second outside case having the same outline dimensions as a case for standard compact cassettes, wherein the first inside case for microcassettes consists of a main body part and a cover, the main body part being provided with a bottom wall, a rear wall, two side walls and a front wall coupled solidly with said bottom wall, one edge of said rear wall being pivoted on said bottom wall, the cover being pivoted on the other edge of said rear wall, and stopper means constructed and positioned to fit hub holes of two microcassettes in said case and arranged only on said bottom wall, wherein a thickness of said microcassettes in a direction of said stopper means is such that a space remains between said inside case cover and said microcassettes, and wherein said case combination includes a chattering prevention member in said inside case and pressed between said microcassettes and said inside case cover, said chattering prevention member being sized so as to fill said space between said microcassettes and said inside case cover whereby movement of said cassettes is prevented.

2. A case combination for microcassette as claimed in claim 1, wherein the second outside case for microcassettes consists of a case body and a cover, the case body comprising a unitary body including two side walls, a front wall and a bottom wall, the rear part of the bottom wall being partly cut away, the cover comprising a unitary body including a top wall and a pocket part formed by a side wall, a bottom wall and a rear wall which are arranged on the rear part of said top wall, the case body and the cover being mounted pivotally to each other by an arrangement wherein a mounting shaft projecting inwardly from the side wall of the case body is fitted in a mounting shaft hole in the side wall of the pocket part of the cover.

3. The case combination of claim 1 wherein said side walls of said main body part of said first inside case include a plurality of projections positioned and constructed for holding a cassette in said case.

4. The case combination of claim 2 wherein said side walls of said main body part of said first inside case include a plurality of projections positioned and constructed for holding a cassette in said case.

5. The case combination of claim 1 wherein said chattering prevention member is a brochure.

* * * * *